United States Patent Office 2,930,059
Patented Mar. 29, 1960

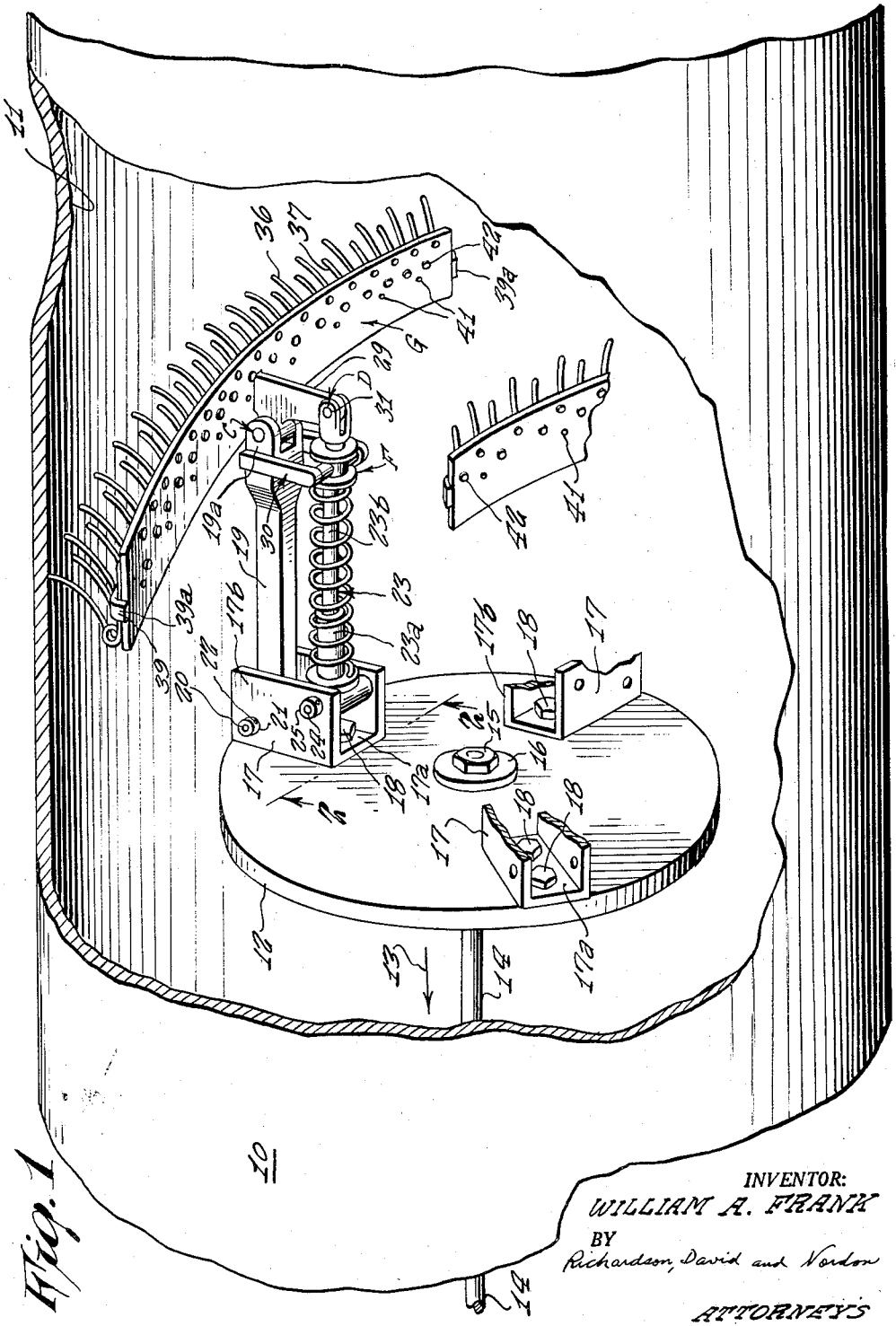

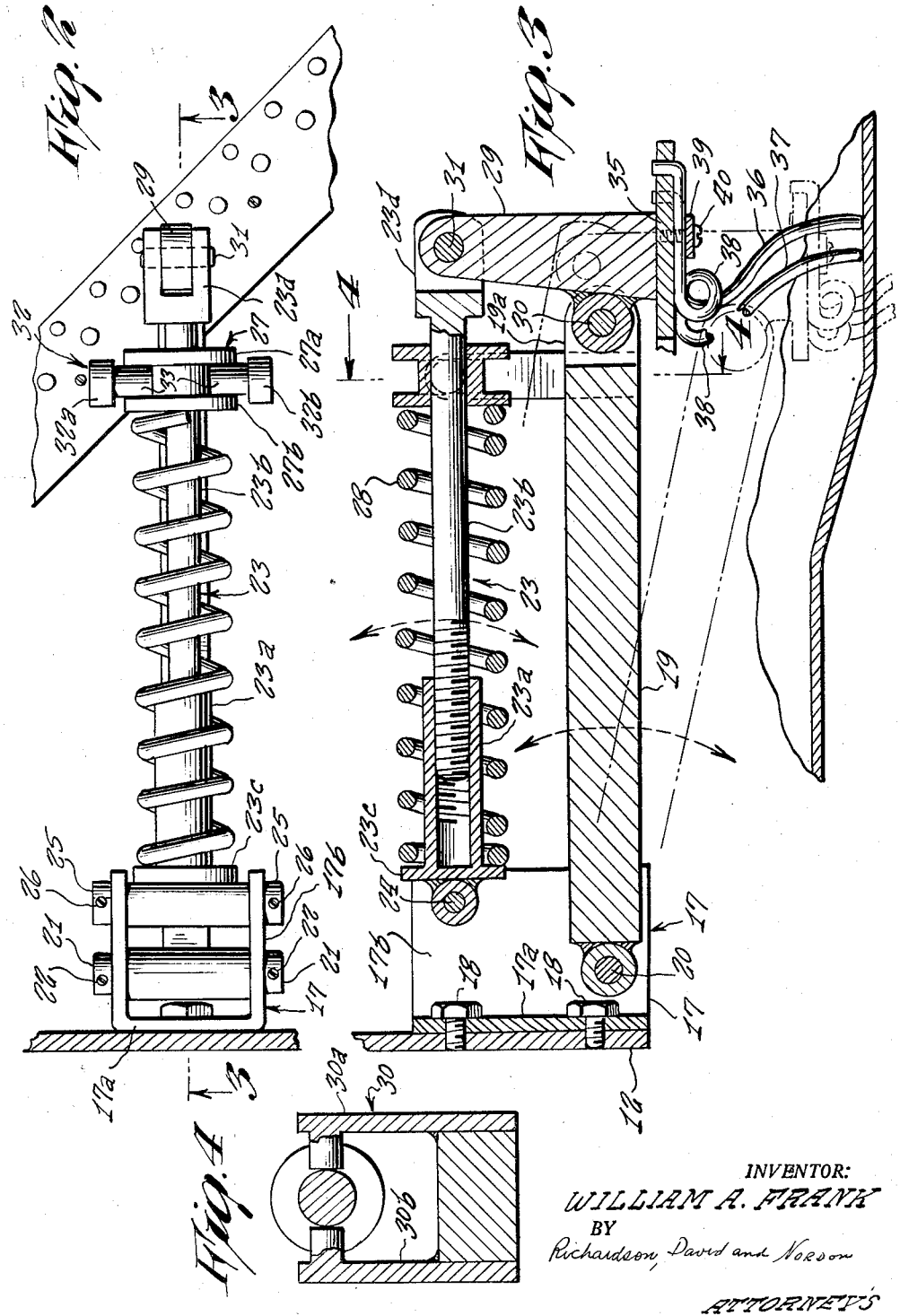

2,930,059
EXPANSIBLE PIPE CLEANER

William A. Frank, Jersey City, N.J., assignor to National Water Main Cleaning Co., New York, N.Y., a corporation of Maine Application May 21, 1954, Serial No. 431,442

5 Claims. (Cl. 15—104.18)

The present invention relates to a scraping device for cleaning the internal surfaces of water mains or similar hydraulic ducts, and more particularly to a device of this character adapted to be drawn or pulled longitudinally through the pipe to be cleaned under circumstances in which the internal diameter of the hydraulic duct varies along its length through an unusually wide dimensional range.

The present invention embodies certain improvements over my U.S. Patent No. 2,620,497, issued on December 9, 1952, for a similar device.

An object of the invention is the provision of a scraping device for cleaning the interior of a water main or similar hydraulic duct of circular cross-section, the scraping device being arranged to exert a substantially uniform lateral scraping pressure against the internal wall surface of the duct throughout its entire circumference, notwithstanding a wide range of dimensional variation in the internal diameter of the duct from point to point along its length.

A further object of the invention is the provision of a scraping device of this character which may be pulled past constrictions disposed in the path of fluid flow, such as venturis, valves having a through passage of reduced diameter, or through a length of pipe of smaller internal diameter than the remainder of the duct, the insertion of smaller size pipe frequently being necessitated in the course of emergency repairs when pipe of the correct size is not immediately available.

Still another object of the invention resides in the provision of resilient scraping elements secured to flexible supporting members of helical segmental configuration, each segmental member being supported by an adjustable articulated spring pressed substantially parallelogram quadrangular link mechanism which exerts substantially constant outward radial pressure on each movable helical segmental supporting member notwithstanding a wide range of radial displacement of such supporting member.

Other and further objects, features and advantages of the invention will become apparent upon reading the following specification together with the accompanying drawing forming a part hereof.

Referring to the drawing:

Figure 1 is a fragmentary perspective view of an embodiment of the invention, partly broken away to illustrate details of construction.

Figure 2 is an enlarged fragmentary side view, partly in longitudinal section, taken along the line 2—2 of Fig. 1, looking in the direction of the arrows.

Figure 3 is an enlarged side view in longitudinal section taken along the line 3—3 of Fig. 2, looking in the direction of the arrows.

Figure 4 is a rear end view in transverse section, taken along the line 4—4 of Fig. 3, looking in the direction of the arrows.

Referring to Fig. 1, there is shown a horizontally extending water main or similar hydraulic duct 10 of circular cross-section, of which the internal lateral surface 11 is to be cleaned.

The scraping device of the present invention comprises supporting means such as a circular disc-shaped base plate 12 the diameter of which is considerably smaller than the diameter of the internal lateral surface 11 of the duct 10. The plate 12 is adapted to be drawn to the left as viewed in Fig. 1 in the direction of the arrow 13 by suitable pulling means (not shown) connected to the pulling rod 14. The pulling rod 14 extends along the longitudinal axis of the duct 10 and is secured to plate 12 by means comprising a hexagonal nut 15 and washer 16. The base plate 12 which is circular or disc-shaped, has a central axis which is adapted to be positioned coaxially with the duct 10 during operation of the pulling means to draw the scraping device longitudinally through the duct.

Secured to plate 12 are a plurality of regularly arranged supporting brackets 17 of U-shaped cross-section circumferentially spaced at equal angles from each other. Each bracket 17 is secured to plate 12 by a pair of bolts 18 threaded into plate 12 and passing through the central web portion 17a of each bracket 17. A first parallelogram link member 19 is pivoted to each of the brackets 17 at its forward end by a pivot pin 20 which is journaled in the spaced lateral ear portions 17b of each bracket 17, the forward end of each link member 19 being disposed intermediate the ear portions 17b of its associated bracket 17. Movement of each pivot pin 20 along its longitudinal axis is prevented by a pair of collars 21 secured by set screws 22 to opposite ends of pivot pin 20 which extend outwardly beyond the ear portions 17b of each bracket 17.

A group of second spring supporting parallelogram link members 23 are provided and one of these is shown with an interiorly threaded sleeve portion 23a pivoted at its forward end to its associated bracket 17 intermediate the ears 17b of the bracket by a further pivot pin 24. Pivot pin 24 is located rearwardly and radially inwardly of pivot pin 20, the line joining the centers of the pivot pins 20 and 24 defining a third fixed parallelogram link member. Movement of pivot pin 24 along its longitudinal axis is prevented by collars 25 secured to projecting end portions of pin 24 by set screws 26.

In threaded engagement with each sleeve portion 23a of each second link member 23 is an exteriorly threaded adjustable rod portion 23b. A collar member 27 comprising spaced flange portions 27a and 27b is freely slidable on rod portion 23b near the rearward end thereof. Sleeve portion 23a comprises an outwardly extending circular flange portion 23c. A helical compression spring 28 is mounted on second link member 23 and one end thereof bears against the flange portion 23c. The other end of helical compression spring 28 bears against the forward flange portion 27b of collar member 27, yieldingly urging the collar member 27 rearwardly along rod portion 23b of second link member 23.

The rearward end of second link member 23 terminates in a bifurcated head portion 23d. The head portion 23d may be integrally formed with the rod portion 23b, if desired. The first link member 19 also terminates in a bifurcated portion 19a.

A fourth link member 29 is pivotally secured to first and second link members 19 and 23 by pivot pins 30 and 31, respectively, mounted in the bifurcated portions 19a and 23d. The fourth link member 29 completes the parallelogram link movement comprising first member 19, second member 23, and the third member fixed with respect to base plate 12 and defined by a line joining the centers of the fixed pivot pins 20 and 24. The length of link member 23 is adjustable by turning rod portion 23b in threaded sleeve portion 23a with link member 29 disconnected.

A yoke 32 comprising parallel arms 32a and 32b, both fixed to first link member 19 is disposed near the rearward end of first link member 19 and the yoke arms 32a and 32b embrace the collar member 27. Secured to each of the arms 32a and 32b of yoke 32 is an inwardly directed pin 33 which extends into the circular groove defined by the spaced flange portions 27a and 27b of collar member 27. The pins 33 are in axial alignment with each other and engage diametrically opposed portions of collar member 27. Compression spring 28 presses on collar member 27 and produces a turning moment urging first link member 19 in a clockwise direction as viewed in Fig. 3. This, in turn, urges fourth link member 29 radially outwardly with respect to the longitudinal axis of the duct 10 which is being scraped.

Fixed to the outer end of fourth link member 28, as by welding, is a curved scraping finger supporting member 35 shaped in the form of a helical segment with its axis of curvature parallel to the longitudinal axis of the duct 10. The helical segments 35 are arranged with equal pitch in the same direction. Each helical segment 35 carries two rows of resilient scraping fingers 36 and 37 disposed one behind the other in staggered arrangement. Each of the fingers includes a torsion spring portion 38 in the form of a circular bend which increases the effective length of the finger for purposes of resiliency. The two rows of scraping fingers 36 and 37 are secured in staggered arrangement to each of the finger supporting members 35 by a common clamping strip 39 secured to each helical segmental member 35 by a plurality of screws 40 threaded into tapped holes 41 in the member 35. The ends of each clamping strip 39 are bent over the ends of the helical member 35 as indicated at 39a. The link members 19, 23 and 29 permit radial movements of the helical segments 35 but prevent rotation thereof with respect to axes perpendicular to and intersecting the axis of the base plate or supporting means 12, thus maintaining an effectively constant helical pitch for each segment 35 and thereby assuring an effective scraping engagement with the entire periphery of the duct wall during inward and outward radial displacements of the helical segments 35.

The short fixed ends of the two rows of scraping fingers 36 and 37 are bent at right angles and are inserted in holes 42 formed in each helical segmental finger supporting member 35 to prevent movement of the individual scraping fingers relative to the helical supporting member 35.

The helical segments constituted by the finger supporting members 35 are arranged with the same amount of pitch in the same direction and their centers or midpoints lie substantially in a common plane perpendicular to the longitudinal axis of the duct 10. The end portions of the helical segments 35 are disposed one in front of the other, in such manner that when the duct 10 is of maximum internal diameter there will be no unscraped portion as the two rows of fingers 36 and 37 on each segment 35 are drawn through the duct. With a reduced diameter of duct, the rearward portion of each helical segment lies behind the forward portion of an adjacent helical segment. The finger supporting members 35 are sufficiently flexible to cooperate with the scraping fingers 36, 37 in maintaining effectively uniform scraping pressure over a wide range of variation in the internal diameter of the duct 10. The compression spring 28 acting on collar 27 of each parallelogram link movement described above maintains an effectively constant radially outwardly directed force on its associated helical finger supporting member 35 over a wide range of variation in the internal diameter of the duct 10. This constant pressure is distributed to the several scraping fingers by virtue of their own resiliency and the limited flexibility of the finger supporting member 35.

It will be appreciated that each of the "parallelogram link" movements described above may be a quadrangular link movement which deviates somewhat from a true parallelogram by adjustment of the length of the second link member 23. This will cause a certain amount of rocking of the movable supporting member 35 which it carries during inward and outward radial movement of the supporting member 35. Ordinarily, however, the quadrangular link movement will have a substantially parallelogram adjustment.

In operation, the outward radial movement of each supporting member 35 is limited by engagement of its associated collar member 27 with a stop member constituted by the bifurcated head 23d of the threaded rod portion 23b of the second link member 23 upon which the collar 27 slides. When the scraping device comes to a T for a branch pipe, for example, one of the scraping members is free to move outwardly to a limited extent into the branch connection without affecting the scraping action of the other scraping members. This limited amount of outward radial movement may be adjusted by means of the threaded rod 23b. It will be observed that the scraping fingers 36 and 37 are substantially uniformly distributed throughout the length of each of the circumferentially elongated segments 35. Each set of scraping fingers 36 and 37 is thus arranged for scraping engagement with a predetermined circumferential portion of the internal surface 11 of the duct 10. These individual circumferential portions of the internal surface 11 overlap each other at their ends so that the entire internal surface 11 is completely and progressively scraped throughout its whole circumference by the fingers 36 and 37 as the scraping device is drawn longitudinally through the duct. It is not necessary to rotate the scraping device in order to scrape the entire surface 11. Furthermore, any incidental rotation produced by pulling the device through the duct 10 has no adverse effect on the scraping action.

It will be apparent to those skilled in the art that many changes and modifications may be made in the specific illustrative embodiments of the invention which are herein shown and described without departing from the scope of the invention as defined in the appended claims.

What is claimed is:

1. A scraping device of the class described adapted to be drawn longitudinally through a duct of circular cross-section of which the internal diameter is appreciably different at different longitudinal portions thereof, said device comprising: supporting means adapted to be connected to pulling means for drawing said device longitudinally through the interior of said duct, said supporting means having an axis adapted to be positioned coaxially with said duct during operation of said pulling means; a plurality of movable members each shaped generally in the form of an elongated helical segment, all of said segments having the same direction of helical pitch, the rearward end portion of each segment being disposed behind the forward end portion of an adjacent segment and with the axis of curvature of each segment substantially parallel to said axis of said supporting means; articulated connecting means connecting each of said movable members to said supporting means for independent movement inwardly and outwardly with respect to said axis of said supporting means, said connecting means including means for maintaining the helical pitch of each of said movable members effectively constant during said inward and outward movement thereof; resilient means simultaneously urging all of said movable members outwardly with respect to said longitudinal axis of said supporting means; and a plurality of scraping members carried by each movable member, said scraping members being substantially uniformly distributed throughout the length of the movable member by which they are carried, whereby the entire inner surface of said duct is progressively engaged by said scraping members as said device is drawn longitudinally therethrough, notwithstanding a predetermined range of variation in the internal diameter of said duct, said connecting means comprising a plurality of substantially parallelogram quadrangular link movements, a separate link movement for each of said movable members, each link movement having one link thereof fixed with respect to said supporting means, each of said movable members connected to one of said link movements by a link opposite said fixed link, said resilient means comprising a plurality of spring means each connected to and acting on one of said quadrangular link movements, said spring means including a plurality of helical springs each longitudinally slidably surrounding one of the links of one of said link movements, and said surrounded link being connected to said fixed link thereof, the other link which is connected to said fixed link being provided with a projection for yielding engagement by one of said helical springs.

2. A scraping device of the class described adapted to be drawn longitudinally through a duct of circular cross-section of which the internal diameter is appreciably different at different longitudinal portions thereof, said device comprising: a supporting means operationally spaced from the internal surface of said duct and adapted to be connected to pulling means for drawing said device longitudinally through the interior of said duct, said supporting means having an axis adapted to be positioned coaxially with respect to said duct during operation of said pulling means; a plurality of quadrangular independently movable substantially parallelogram link movements, each comprising first and second elongated link members each of which has one end pivoted to said supporting means for simultaneous pivotal movement of said link members about two spaced parallel axes which are fixed with respect to said supporting means, a line joining said parallel axes defining a third fixed link member, and a fourth link member connected to the other ends of said first and second link members; circumferentially elongated scraping means connected to each of said fourth link members and disposed for scraping engagement with a predetermined circumferential portion of the internal surface of said duct during operation of said pulling means, the ends of said circumferential portions overlapping each other throughout a predetermined range of variation of the internal diameter of said duct, said link members maintaining said scraping means angularly fixedly positioned with respect to said axis of said supporting means; a plurality of mutually independent resilient means each acting on one of said link movements and yieldingly urging each of said scraping means radially outwardly for scraping engagement with the internal wall surface of said duct; and individual stop means connected with each of said scraping means for limiting said radial outward movement, and means for adjusting the relative lengths of said first and second link members with respect to each other.

3. A scraping device of the class described adapted to be drawn longitudinally through a duct of circular cross-section of which the internal diameter is appreciably different at different longitudinal portions thereof, said device comprising: supporting means operationally spaced from the internal surface of said duct and adapted to be connected to pulling means for drawing said device longitudinally through the interior of said duct, said supporting means having an axis adapted to be positioned coaxially with respect to said duct during operation of said pulling means; a plurality of quadrangular independently movable substantially parallelogram link movements, each comprising first and second elongated link members each of which has one end pivoted to said supporting means for simultaneous pivotal movement of said link members about two spaced parallel axes which are fixed with respect to said supporting means, a line joining said parallel axes defining a third fixed link member, and a fourth link member connected to the other ends of said first and second link members; circumferentially elongated scraping means connected to each of said fourth link members and disposed for scraping engagement with a predetermined circumferential portion of the internal surface of said duct during operation of said pulling means, the ends of said circumferential portions overlapping each other throughout a predetermined range of variation of the internal diameter of said duct, said link members maintaining said scraping means angularly fixedly positioned with respect to said axis of said supporting means; a plurality of mutually independent resilient means each acting on one of said link movements and yieldingly urging each of said scraping means radially outwardly for scraping engagement with the internal wall surface of said duct; and individual stop means connected with each of said scraping means for limiting said radial outward movement, one of said first and second link members being disposed closer to the axis of said supporting means than the other of said two link members, and said resilient means comprising a helical compression spring mounted on said one link member, said other link member provided with a lateral extension against which said compression spring presses, said lateral extension directed toward said axis of said supporting means, and said stop means comprising a stop member carried by said one link member, said stop member engageable with said lateral extension for limiting relative movement of said one link member with respect to said other link member.

4. A device according to claim 3 in which each of said scraping means comprises a supporting member shaped generally in the form of a helical segment, all of said segments being of equal helical pitch in the same direction and each having an axis of curvature substantially parallel to said axis of said support means, the rearward portion of each segment being disposed behind the forward portion of an adjacent segment, the central portion of each segment being secured to one of said fourth link members, and a plurality of scraping fingers carried by each of said supporting members.

5. A device according to claim 4, wherein the midpoints of said segmental scraping members lie substantially in a common plane perpendicular to said axis of said supporting means.

References Cited in the file of this patent

UNITED STATES PATENTS

| | | |
|---|---|---|
| 168,072 | Williams | Sept. 21, 1875 |
| 253,884 | Odell | Feb. 21, 1882 |
| 582,953 | Robeson et al. | May 18, 1897 |
| 682,285 | Seaton | Sept. 10, 1901 |
| 695,828 | Nelson | Mar. 18, 1902 |
| 728,085 | Cruzan | May 12, 1903 |
| 1,132,691 | Sieben | Mar. 23, 1915 |
| 1,481,708 | Guerra | Jan. 22, 1924 |
| 1,676,825 | Haase | July 10, 1928 |
| 2,278,026 | Smith | Mar. 31, 1942 |
| 2,620,497 | Frank | Dec. 9, 1952 |

FOREIGN PATENTS

| | | |
|---|---|---|
| 159,729 | Germany | Apr. 7, 1905 |